Patented July 10, 1951

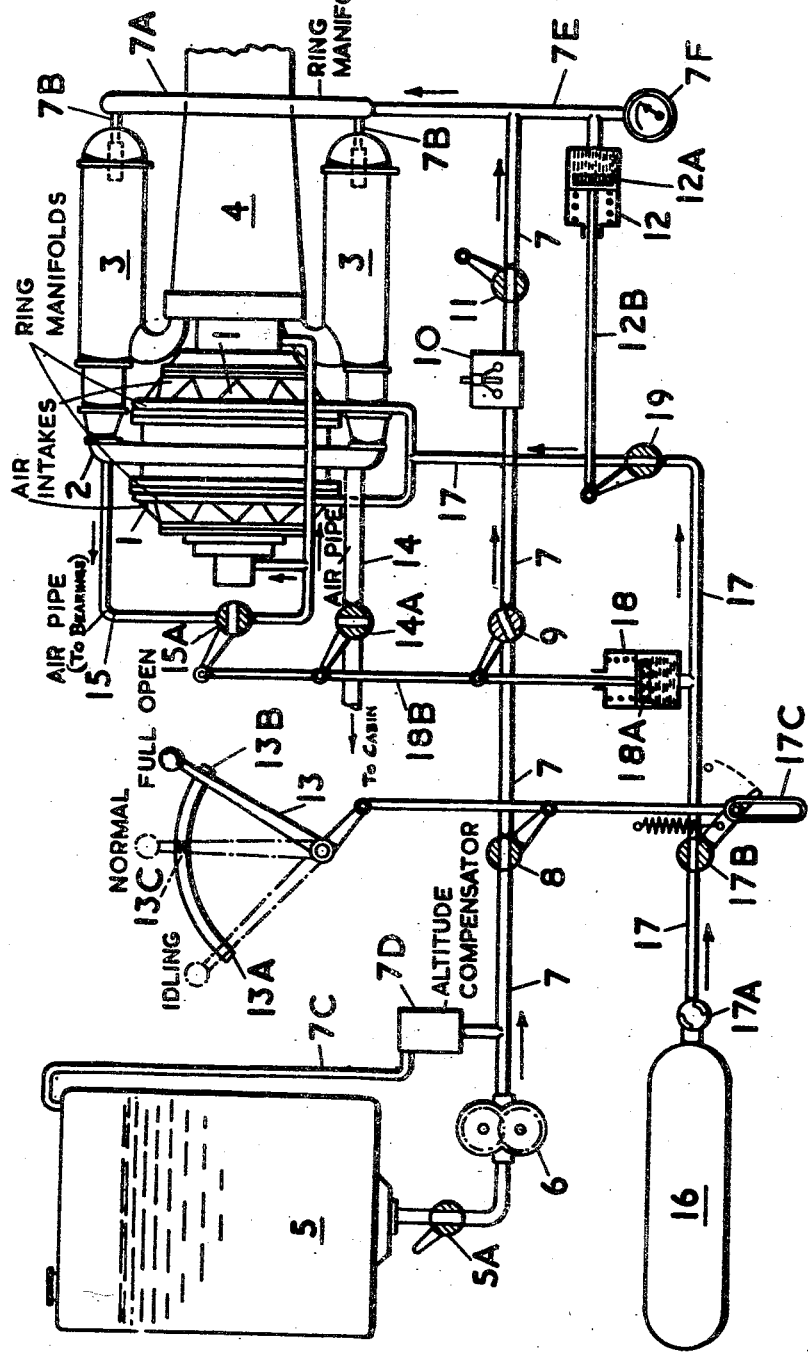

2,559,814

UNITED STATES PATENT OFFICE 2,559,814

COOLING COMBUSTION-ENGINE AIR SUPPLY BY AMMONIA

Frank Whittle, Rugby, England, assignor to Power Jets (Research & Development) Limited, London, England Application October 18, 1945, Serial No. 623,131
In Great Britain November 17, 1942

Section 1, Public Law 690, August 8, 1946
Patent expires November 17, 1962

11 Claims. (Cl. 60—41)

This invention is concerned with the use of ammonia primarily as a refrigerant but also for other purposes, supplied to the working air of a combustion engine wherein a reduction of intake air temperature is effective to enhance performance. The term "combustion engine" is intended to include combustion gas turbines in which air, being the working fluid, is compressed, heated by combustion of fuel therein, and expanded through a turbine which drives the compressor; and internal combustion engines in the more usual sense of reciprocating engines in which the compression, combustion, and expansion occur in cylinders, whether or not there is also initial compression in a supercharger, and for the purposes of this specification the term is to be interpreted as meaning such engines whenever they are such as to have their performance enhanced by a reduction of intake air temperature An object of the invention is to improve the propulsive thrust of gas turbine power plant of aircraft, especially one of which all or substantial part of the available work is in the form of a jet for reaction-propulsion.

Another object is to improve the performance of a supercharged or a normally-aspirated internal combustion engine.

Another object is, more specifically, to provide means for temporarily boosting the power of a combustion engine, the outstanding example being for aircraft take-off or where for operational reasons a comparatively short burst of extra power is required.

Another object is to mitigate or obviate the formation of ice at the air intake of a combustion engine.

Another object is to reduce working temperatures whereby in some cases an engine may be worked at a higher rating than might otherwise be the case.

Another object is to afford refrigeration or cooling of the intake air, whilst replacing a proportion of the fuel normally used by the refrigerant itself.

The primary effect of the ammonia as proposed to be used, is to act as a coolant or refrigerant by vaporisation, whereby the density of the air into which it is injected is increased whilst working temperatures may be lowered.

The idea underlying the invention is the provision of means for injecting liquid ammonia into the air entering a combustion engine in such a manner that the ammonia in evaporating cools this air which enters the engine in its cooled condition; the provision of means to facilitate rapid evaporation by atomisation; control means for the ammonia; and in particular an arrangement for installation in conjunction with a gas-turbine aircraft power plant of the kind previously mentioned.

It has been proposed previously to use ammonia as a fuel or an ingredient of fuel for an internal combustion engine. So far from utilizing the cooling effect of volatilization of the ammonia in such proposal, it was intended in such proposal to supply the required latent heat by heat-exchanging means, for example deriving heat from engine waste heat sources. In the present invention the property of ammonia to burn with release of heat energy is secondary, and the invention is concerned with the use of ammonia as a coolant or refrigerant for the supplied air, and therefore with a technique directly opposed to any suggestion of supplying heat to the ammonia except at the expense of the temperature of the working air.

The invention will now be described by way of example, as a complete installation in conjunction with a gas-turbine jet-propulsion aircraft power plant, in which example it is assumed that the ammonia is intended primarily to be used for take-off boost.

The accompanying diagram illustrates the relevant features of this installation.

The engine is one having a centrifugal compressor with bilateral air intakes at 1, compressor casing 2, combustion chambers 3, and exhaust or propulsion pipe 4.

The normal fuel, e. g. kerosene, is supplied from a tank 5 through a cock 5A to a gear-pump 6 which is driven by the engine. The fuel under pressure then passes by the main fuel pipe 7 to a ring manifold 7A to individual burners 7B spraying within the combustion chambers 3. Branched from the pipe 7 is a return pipe 7C including a relief-valve at 7D (which is preferably controlled by atmospheric pressure as in known practice) which passes fuel surplus to engine requirement, back into the tank 5. Next in the pipe 7 is the pilot's control valve 8 which controls the rate of fuel supply to the burners 7B. At 9 is a further valve, which is best described as a "partial throttle" and which is such as to permit alternatively free, or partly restricted, flow of fuel. Next is a centrifugal governor 10 driven in accordance with engine speed and operating as a top-speed governor. Finally there is a "high-pressure cock" 11 which is a stop-cock enabling the pilot to stop all fuel supply. It should be mentioned here that the practice is to provide the control valve 8 in such a way that when "closed" sufficient fuel passes for the engine to idle.

Branched from the pipe 7 is a pipe 7E to a pressure-gauge 7F indicating the burner pressure to the pilot. Also connected to pipe 7E is a cylinder 12 with spring-loaded piston 12A from which extends a piston rod or equivalent connection 12B. The piston 12A and its spring, are such as to be forced outwards (i. e. to the left) when sufficient burner pressure exists.

The foregoing describes the fuel system proper. Its use and application as such being known to those accustomed to the art, will not be further described. It may however be mentioned that top-speed governors 10 now in use are not well adapted to operate over a wide range and for this purpose the valve 9 (of which the function will be described) is introduced. The control valve 8 is operated by the pilot's throttle lever 13, shown full advanced i. e. open or "on."

The engine is provided with an air pipe 14 from the casing 2, to supply pressure air to the pilot's cabin for altitude flight, and for heating. In this pipe is a shut-off valve 14A. There is a pipe 15 also from the compressor, supplying compressed air to the engine bearings in known manner: in this air pipe 15 is a shut-off valve 15A.

A pressure bottle 16, preferably arranged to be readily jettisoned from the aircraft, contains liquid ammonia, at its vapour pressure. It discharges its contents through the ammonia pipe 17, through a coupling 17A of any suitable type allowing disconnection when jettisoning occurs. In the pipe 17 is the ammonia control valve 17B, spring loaded towards "shut" and openable by the last stage of "opening" movement of the pilot's throttle lever 13, by virtue of a motion-losing connection shown at 17C. The control valve 8 is arranged to be unaffected by this last stage of lever movement, unless in accordance with an alternative to fitting the valve 9, the valve 8 be arranged to partially close during this stage.

Next in the pipe 17 is a branch to a pressure cylinder 18 in which the ammonia pressure forces a piston 18A against spring-load, thereby moving a rod (or equivalent) connection 18B which operates the valves or cocks 9, 14A and 15A. In the pipe 17 further downstream is a shut-off cock 19 operated by the rod 12B. Finally, pipe 17 leads, branched, to the two air intakes 1, where the ammonia is injected from two ring manifolds each having a row of atomising jets which may be plain holes or be of any convenient form such as the well-known centrifuging or "swirl" type.

The following is the functional description.

There is shown, at the throttle lever 13, a quadrant with an idling stop at 13A, a full-open stop 13B, and a location at 13C. The normal operating range is from 13A to 13C, and this covers all control from idling to "full throttle" on normal fuel without ammonia. The usual practice is followed, that the governor 10 looks after the actual top speed of the engine, whilst the device at 7D by compensating for altitude, leaves the movement range of the lever 13 unaffected by altitude. Assume the bottle 16 to be fully charged, a pressure in the order of 70 lbs. per sq. inch (exact value determined by temperature) will exist in it. Now if the pilot moves the lever from 13C to 13B, the valve 8 remains wide open, but the linkage at 17C causes the valve 17B to open. Ammonia now flows via 17, to be injected into the air at 1. The ammonia pressure in the pipe 17 moves the rod 18B to shut off the bearing air (at 15A) shut off the cabin air (at 14A) and restrict the flow of fuel in the pipe 7 (at 9). The bearing air is shut off to prevent ammonia from being pumped from the compressor to the bearings and into the lubricant; the cabin air is shut off to prevent gassing the occupants of the cabin with ammonia; and the fuel supply is reduced because the consequence of supplying combustible ammonia to the engine, is in effect to reduce the engine's demand on normal fuel to an extent which the governor 10 may not be well adapted to cope, so that there might be a risk of overspeeding if the main fuel supply were not reduced by this additional means.

The valve 19 remains open so long as there is sufficient burner pressure (as registered at 7F) to hold it open; if the burner pressure were to fall by engine failure or other reason, the valve 19 would close, stopping the ammonia supply, as would then be desirable.

When the contents of the bottle 16 are expended, the ammonia pressure obviously ceases to exert itself on the piston 18A, and consequently 9, 14A and 15A, all re-open for normal service. Since comparatively short periods of ammonia use are contemplated, no harm will result from a like period of cessation of air supply to bearings.

As above mentioned, the valve 9 may be omitted if the control valve be so contrived that it closes slightly when lever 13 is moved from 13C to 13B; but there is an advantage in the arrangement shown, in that independent of the pilot if the ammonia supply ceases the valve 9 reopens fully, automatically, so that full normal fuel supply is resumed. It is contemplated that for take-off, the engine will be run up to full normal speed, i. e. governed speed, prior to take-off; at the beginning of the take-off or during the run, the pilot moves lever 13 fully forward. Assuming burner pressure to be full and satisfactory, ammonia is thereupon supplied and simultaneously the normal fuel is throttled (by valve 9) so as to ensure that the governor 10 does not have to approach an extremity of—or go beyond—its operating threshold; the cabin air is cut off, also the bearing air. The aircraft being assumed to become airborne and to reach a certain height, the ammonia is fully expended. There will be a reduction of thrust noticeable to the pilot and comparable to the throttling back which is usual practice when comfortably airborne. Thereafter the pilot can return lever 13 to 13C or further back, as appropriate, and will, if the operation requires, jettison the bottle 16. If there were a partial or a complete engine failure during the boost period, the ammonia would be automatically partially or wholly cut off by the valve 19: the arrangement of the piston 12A and its spring, and of the valve 19, may be made such as to confine this action to a narrow or a wide range of fuel pressure as may be expedient. If the pilot for any reason—for example an impending accident, cuts off fuel by the high pressure cock 11, the ammonia is automatically cut off by the consequent failure of pressure in the cylinder 12.

The first effect of injecting ammonia is the cooling of the working air of the engine. This affords, in effect, an increased mass flow (rate of flow of air in terms of mass per unit time) which is a criterion of thrust. A further effect is to replace, as it were, a proportion of the normal fuel by ammonia. Another practical effect is in some cases to reduce the working gas temperature; since gas temperature is in general a limiting factor in the operation of a gas turbine this is an important effect, because the reduction of temperature will permit the engine to be run at a higher speed. Thrust increases very rapidly with speed, in the upper range of operational speed, so that an overspeed may be permitted with very great consequential increase of thrust. If full advantage is to be taken of this, the setting of the governor 10 may be caused to be adjusted to permit overspeed, by connection with the rod 17 or, less preferably, from lever 13: this would provide what may be called governor "over-ride."

The effectiveness of ammonia injection is largely dependent upon the relative humidity of the air, and consequently there may be an adjustment provided—e. g. associated with the valve 17B—to allow flight-to-flight variation of the rate of ammonia supply in accordance with ascertained atmospheric humidity. If ice conditions are to be met, the effect of ammonia at the intakes 1, which constitute a region believed to be peculiarly sensitive to ice accretion may be to obviate or minimize accretion by (a) reducing the freezing point of water (b) raising the water temperature by exothermic action on going into solution. The ammonia injection system described may obviously be readily combined with further equipment such as local sprays, to prevent icing of regions other than those of the intakes 1.

In an engine of the type pointed to in the foregoing description, no deleterious effects are found due to ammonia providing reasonable precautions are taken: and it has not been found necessary to modify the combustion system in order to cause combustion of the ammonia since perfection of that combustion is not sought. In some engines however, it may be found necessary to modify from existing practice, to develop reasonably fully the potential advantages of the invention.

I claim:

1. The combination of a combustion engine as defined, with a closed container for holding liquid ammonia, a conduit to lead liquid ammonia from said container to a working air intake of said engine, means for spraying said liquid ammonia directly into said intake to effect substantial cooling of the air entering said intake by evaporation of said liquid ammonia in said air, and valve means in said conduit to control the delivery of liquid ammonia therethrough.

2. The combination of a gas turbine aircraft power plant comprising a centrifugal compressor, means for burning fuel in the output thereof, and turbine means operated by the combustion products produced thereby and driving the compressor, with a container for liquid ammonia, a conduit for leading liquid ammonia to an air intake of said compressor, and a plurality of jet nozzles for spraying liquid ammonia directly into said air intake, to effect substantial cooling of air entering said intake by the evaporation of the said liquid ammonia therein.

3. The combination according to claim 1 further comprising a controllable normal fuel supply system for said engine, controllable supply system to inject liquid ammonia into the working air intake of said engine, and means to render the control of the normal fuel and control of the liquid ammonia interdependent.

4. The combination according to claim 3 further comprising single manually operable means to control liquid ammonia and normal fuel supply systems whereby the liquid ammonia system delivers ammonia only when the fuel supply system is controlled to deliver normal fuel at an appropriate rate.

5. The combination according to claim 1 further comprising a controllable normal fuel first supply system therefor, a controllable second supply system to deliver liquid ammonia to the working air intake of said engine for evaporation in and cooling of the air entering said intake, said air entering the engine in its cooled condition, valve means in said second system to prevent or allow delivery of ammonia, and pressure-operated means connected to said first system responsively to pressure of the normal fuel and connected to said valve means to render supply of ammonia dependent upon sufficiency of such pressure.

6. The combination according to claim 1 further comprising a controllable normal fuel first supply system therefor, a controllable second supply system to deliver liquid ammonia to the working air intake of said engine for evaporation in and cooling of the air entering said intake, said air entering the engine in its cooled condition, conduit means to deliver compressed air from said engine for ancillary use, valve means to control such air delivery and means to interrelate the delivery of ammonia in said second system with operation of said valve means.

7. The combination according to claim 1 further comprising a controllable normal fuel first supply system therefor, a controllable second supply system to deliver liquid ammonia to the working air intake of said engine for evaporation in and cooling of the air entering said intake, said air entering the engine in its cooled condition, conduit means to deliver compressed air from said engine for ancillary use, valve means to control such air delivery, and means operative by the pressure of ammonia in delivery through said second system to actuate said valve means.

8. In combination, a combustion gas turbine engine comprising an air compressor, burners to supply a normal fuel for combustion in the air compressed thereby, and a turbine operated by the combustion products thereof and driving the compressor, a normal fuel supply conduit to supply fuel under pressure to said burners, a throttle valve in said conduit, a second supply conduit for liquid ammonia under pressure, a control valve in said second conduit, and means to deliver liquid ammonia supplied by said second conduit for evaporation in and cooling of air received by said compressor, said air entering said compressor in its cooled condition.

9. The combination claimed in claim 8, further comprising stop valve means in said second supply conduit, and means actuated by the fuel pressure acting in said first conduit to control said stop valve means.

10. The combination claimed in claim 8, further comprising governor means responsive to engine speed and controlling the supply of normal fuel in said first conduit, flow-reducing valve means in said first conduit and means responsive to the delivery pressure of ammonia in said second conduit to actuate said flow-reducing valve means.

11. A gas turbine aircraft power plant comprising an air compressor, means for burning fuel in the output thereof, turbine means operated by the combustion products produced thereby and driving the compressor and means for injecting liquid ammonia directly into the air intake of said compressor whereby air entering said intake is cooled and is operated on in its cooled condition by said compressor.

FRANK WHITTLE.

REFERENCES CITED

The following references are of record in the file of this patent:

UNITED STATES PATENTS

| Number | Name | Date |
|---|---|---|
| 986,308 | Ostergren | Mar. 7, 1911 |
| 1,777,097 | Lasley | Sept. 30, 1930 |
| 2,140,254 | Zavka | Dec. 13, 1938 |
| 2,365,616 | Zweifel | Dec. 19, 1944 |
| 2,399,046 | Larrecq | Apr. 23, 1946 |
| 2,438,998 | Halford | Apr. 6, 1948 |